United States Patent
Yoakum

(10) Patent No.: US 9,729,694 B2
(45) Date of Patent: Aug. 8, 2017

(54) METHOD AND APPARATUS FOR PROVIDING PRIORITY INDICIA ASSOCIATED WITH A PLURALITY OF MESSAGES

(75) Inventor: John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 603 days.

(21) Appl. No.: 12/981,061

(22) Filed: Dec. 29, 2010

(65) Prior Publication Data

US 2012/0170721 A1   Jul. 5, 2012

(51) Int. Cl.
*H04M 1/725* (2006.01)

(52) U.S. Cl.
CPC .................. *H04M 1/7255* (2013.01)

(58) Field of Classification Search
USPC ............................ 379/88.01–88.26
See application file for complete search history.

(56) References Cited

U.S. PATENT DOCUMENTS

| | | | |
|---|---|---|---|
| 5,568,540 A * | 10/1996 | Greco | H04M 1/575 379/88.11 |
| 7,373,607 B2 * | 5/2008 | Daniell | 715/752 |
| 7,522,712 B2 | 4/2009 | Inon | |
| 7,590,226 B2 | 9/2009 | Dillard et al. | |
| 7,653,606 B2 | 1/2010 | Loughmiller et al. | |
| 7,673,006 B2 | 3/2010 | Bhogal et al. | |
| 7,895,273 B1 * | 2/2011 | Haldar | 709/206 |
| 8,095,613 B1 * | 1/2012 | Perkowitz | G06Q 10/109 709/206 |
| 8,126,120 B2 | 2/2012 | Stifelman et al. | |
| 8,306,191 B2 | 11/2012 | Balasaygun et al. | |
| 2004/0179123 A1 * | 9/2004 | Cazier | 348/333.02 |
| 2004/0247097 A1 | 12/2004 | Dillard et al. | |
| 2005/0188030 A1 | 8/2005 | Hudecek | |
| 2007/0133771 A1 | 6/2007 | Stifelman et al. | |

(Continued)

FOREIGN PATENT DOCUMENTS

| | | | |
|---|---|---|---|
| CN | 1434406 A | 8/2003 | |
| CN | 1968449 A | 5/2007 | |
| EP | 1113631 A2 * | 7/2001 | ........... H04L 12/589 |

OTHER PUBLICATIONS

Perez, Juan Carlos, "Google rolls out email sorting for webmail users," Techworld.com, Aug. 31, 2010, 5 pages, accessed Sep. 30, 2010, http://news.techworld.com/applications/3237389/google-rolls-out-email-sorting-for-webmail-users/.

(Continued)

*Primary Examiner* — Duc Nguyen
*Assistant Examiner* — Assad Mohammed
(74) *Attorney, Agent, or Firm* — Sheridan Ross P.C.

(57) ABSTRACT

A method and apparatus for displaying information about a message. A subset of audio messages is received based on a prioritized list of a plurality of audio messages. The prioritized list of audio messages is prioritized based on a first sender designated priority and a first recipient prioritization attribute corresponding to each of the plurality of audio messages. For each audio message in the subset, a first sender priority indicium indicative of the first sender designated priority of each audio message, and a recipient priority indicium indicative of a priority corresponding to the first recipient prioritization attribute of each audio message, are displayed.

21 Claims, 14 Drawing Sheets

(56) References Cited

U.S. PATENT DOCUMENTS

| | | |
|---|---|---|
| 2007/0274468 A1 | 11/2007 | Cai |
| 2008/0018436 A1 | 1/2008 | Traughber et al. |
| 2008/0075244 A1 | 3/2008 | Hale et al. |
| 2008/0281823 A1* | 11/2008 | Chen et al. ................ 707/7 |
| 2008/0301250 A1 | 12/2008 | Hardy et al. |
| 2008/0301252 A1* | 12/2008 | Lipton ............. H04L 12/587 709/207 |
| 2009/0150507 A1 | 6/2009 | Davis et al. |
| 2009/0210497 A1 | 8/2009 | Callanan et al. |
| 2010/0042717 A1* | 2/2010 | Strandell et al. ............ 709/224 |
| 2010/0161743 A1 | 6/2010 | Krishnamurthi et al. |
| 2011/0161436 A1 | 6/2011 | Moore |
| 2012/0170724 A1 | 7/2012 | Yoakum |

OTHER PUBLICATIONS

Ringel, Meredith, et al., "Automated Message Prioritization: Making Voicemail Retrieval More Efficient," Conference on Human Factors in Computing Systems (CHI 2002), Apr. 20-25, 2002, Minneapolis, Minnesota, ACM 1-58113-454-1/02/0004, pp. 592-593.

Marx, Matthew, et al., "CLUES: Dynamic Personalized Message Filtering," Proceedings of CSCW (Computer Supported Cooperative Work) '96, ACM 0-89791-765-0/96/11, Nov. 1996, pp. 113-121.

Unknown, "Modular Messaging Key Differences for Octel 250/350 Enabled Customers: Differentiators between Octel 250/350 and Modular Messaging R2.0 with the Avaya Message Storage Serve using the Aria TUI," Avaya, Inc. White Paper, Aug. 2005, 43 pages.

Non-final Office Action for U.S. Appl. No. 12/980,968 mailed Jan. 16, 2013, 30 pages.

Non-final Office Action for U.S. Appl. No. 12/981,117 mailed Jan. 3, 2013, 21 pages.

Final Office Action for U.S. Appl. No. 12/980,968 mailed Jun. 12, 2013, 31 pages.

Advisory Action for U.S. Appl. No. 12/980,968 mailed Aug. 20, 2013, 2 pages.

Final Office Action for U.S. Appl. No. 12/981,117 mailed Jul. 10, 2013, 23 pages.

First Office Action for Chinese Patent Application No. 201110461152.8 mailed May 20, 2014, 20 pages.

Non-final Office Action for U.S. Appl. No. 12/980,968 mailed Jun. 5, 2014, 29 pages.

Final Office Action for U.S. Appl. No. 12/981,117 mailed Jun. 9, 2014, 37 pages.

Advisory Action for U.S. Appl. No. 12/981,117 mailed Sep. 18, 2013, 3 pages.

Non-final Office Action for U.S. Appl. No. 12/981,117 mailed Oct. 22, 2013, 33 pages.

Advisory Action for U.S. Appl. No. 12/981,117 mailed Aug. 14, 2014, 3 pages.

Second Office Action for Chinese Patent Application No. 201110461152.8 mailed Jan. 13, 2015, 16 pages.

Final Office Action for U.S. Appl. No. 12/980,968 mailed Feb. 3, 2015, 33 pages.

Notice of Allowance for U.S. Appl. No. 12/981,117 mailed Nov. 21, 2014, 11 pages.

\* cited by examiner

METHOD AND APPARATUS FOR PROVIDING PRIORITY INDICIA ASSOCIATED WITH A PLURALITY OF MESSAGES

RELATED APPLICATIONS

The present application is related to U.S. patent application Ser. No. 12/980,968, filed Dec. 29, 2010, 2010, entitled "METHOD AND SYSTEM FOR DELIVERING MESSAGES," the disclosure of which is relied upon and incorporated herein by reference in its entirety.

The present application is also related to U.S. patent application Ser. No. 12/981,117, filed Dec. 29, 2010, entitled "METHOD AND APPARATUS FOR DELEGATING A MESSAGE," the disclosure of which is relied upon and incorporated herein by reference in its entirety.

FIELD OF THE DISCLOSURE

The present disclosure relates to prioritizing messages in a messaging system, and in particular to providing priority indicia identifying prioritization information used to prioritize messages.

BACKGROUND

Some individuals have jobs that are characterized by sporadic periods of availability intermixed with substantial periods of unavailability. A doctor is an example of such an individual. On a typical day, a doctor's calendar may include nearly back-to-meetings (i.e., appointments) with patients, during which the doctor is generally unavailable to receive or respond to messages from other individuals. There is typically only a very short period of time between appointments. Consequently, it may be difficult for a doctor to respond to messages until the end of the workday, after her last appointment, at which time those seeking the doctor's response may not be available. Unfortunately, this delay results in further delays for those awaiting a response from the doctor, such as other doctors seeking the doctor's thoughts or advice on a matter, or can result in patient dissatisfaction in the event that a patient has to wait all day until he hears from the doctor.

Sometimes a doctor may arrange to have another individual attempt to receive and prioritize messages for the doctor so that the doctor can access messages on a prioritized basis in between appointments. However, prioritizing messages can be difficult. Messages having the same subject matter may have different priorities based on different underlying circumstances that may or may not be apparent from the text of the messages themselves. For example, different senders of similar messages may have widely different perspectives on their messages' urgency, which may affect how quickly they expect a response. A sender's perspective on the urgency of a message may affect how quickly the recipient doctor responds to the message, but it can be difficult or impossible to ascertain from the message itself. Moreover, without a suitable medical background, the individual prioritizing the messages for the doctor may not be able to prioritize the subject matter of the messages in an appropriate manner. Consequently, in between appointments the doctor may be handed numerous messages that require responses, only a few of which she has time to answer immediately, with little guidance as to which of the messages should be responded to first.

It would be beneficial for the doctor to be provided with a very limited number of the most important messages from her message queue, so that the doctor could ensure that her limited time was focused on only those messages which are most critical.

Moreover, where the prioritization of messages is based on multiple different message attributes, it would be beneficial for the doctor to be provided with information that explains the prioritization of the individual attributes. With such information, the doctor may determine that it would be beneficial to process some messages in an order that differs from their priority.

SUMMARY

Embodiments disclosed herein relate to the receipt of a subset of a plurality of prioritized audio messages and prioritization information associated therewith, and the display of such information to a recipient. In one embodiment, a computing device receives a subset of audio messages of a plurality of audio messages based on a prioritized list of the audio messages. The subset comprises at least one audio message. The prioritized list of audio messages is prioritized based on a first sender designated priority and a first recipient prioritization attribute corresponding to each audio message. The computing device displays, for each audio message in the subset, a sender identifier identifying the sender of the each audio message, a first sender priority indicium indicative of the first sender designated priority of the each audio message, and a recipient priority indicium indicative of a priority corresponding to the first recipient prioritization attribute of the each audio message.

In one embodiment, the first sender designated priority identifies a sender message importance of the audio message. In another embodiment, the first sender designated priority identifies a sender response urgency of the audio message. In yet another embodiment, each audio message in the subset of audio messages further includes an associated second sender designated priority designated by the sender. The computing device displays, for each audio message in the subset, the sender identifier identifying the sender, the first sender priority indicium indicative of the first sender designated priority of the each audio message, a second sender priority indicium indicative of the second sender designated priority of the each audio message, and the recipient priority indicium indicative of the priority corresponding to the first recipient prioritization attribute of the each audio message.

The first recipient prioritization attribute may comprise a community attribute that identifies a particular message community of a plurality of message communities of which the sender is a member. Each audio message in the subset may further include an associated aggregate message priority. The computing device may display, for each audio message in the subset, an aggregate message priority indicium indicative of the aggregate message priority of the each audio message, the sender identifier identifying the sender of the each audio message, the first sender priority indicium indicative of the first sender designated priority of the each audio message, and the recipient priority indicium indicative of the priority corresponding to the first recipient prioritization attribute of the each audio message.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments herein relate to a messaging system which prioritizes and meters the delivery of messages to a recipient. Such prioritized and metered delivery of messages enables a busy message recipient to respond to her most important messages on a message-by-message basis in between periods of time when the message recipient is unable to respond to messages. Metering the delivery of messages prevents or reduces the inherent distraction caused when an individual is presented with a substantial number of messages, even when such messages may be prioritized by an attribute such as date. The messaging system disclosed herein provides to a client device only a subset of all messages so that a relatively small number of messages are presented in a prioritized manner to a busy message recipient.

Figure 1:
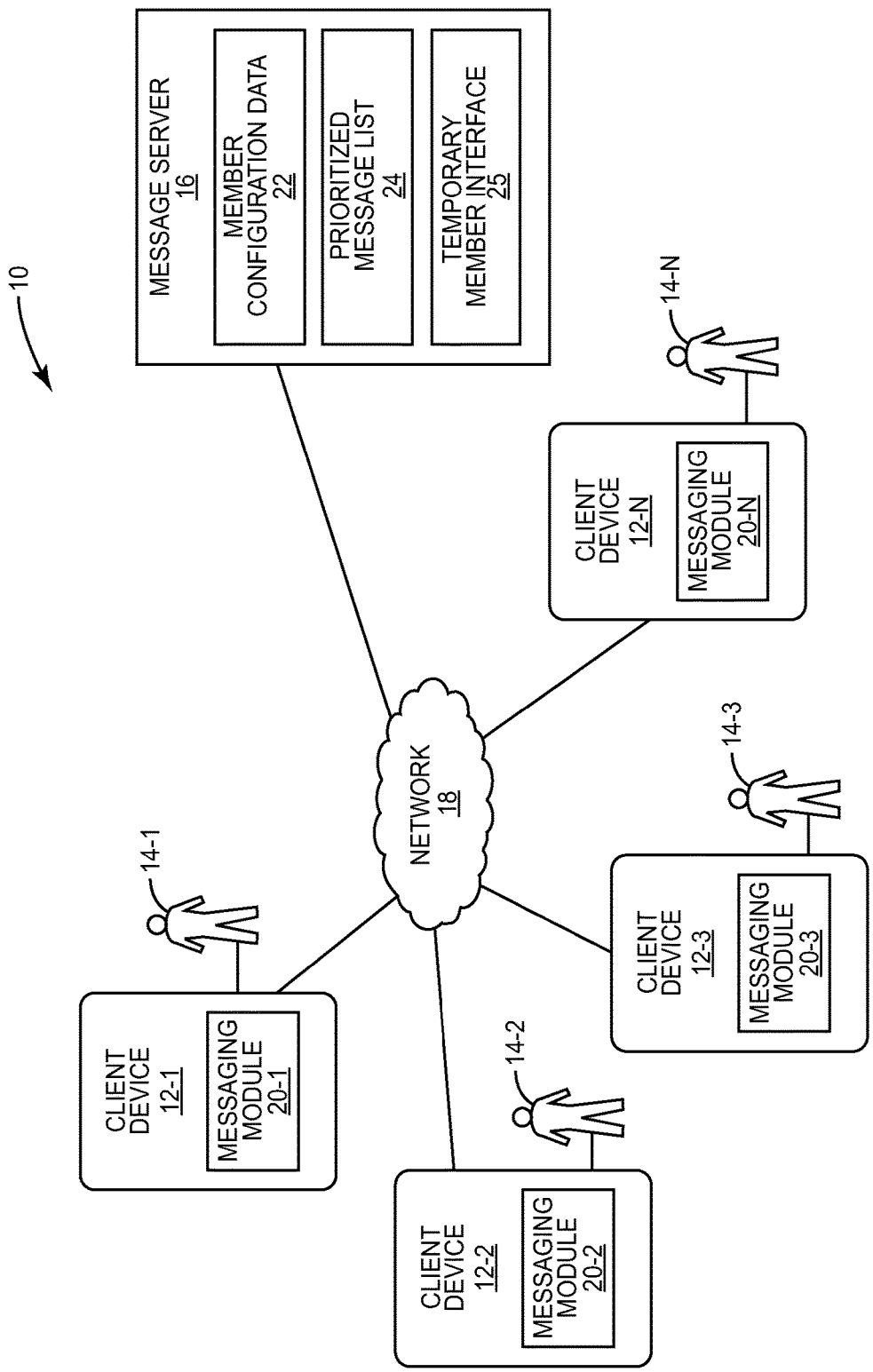
FIG. 1 is a block diagram illustrating an exemplary system for implementing a client server messaging system according to one embodiment.

In one embodiment, the messaging system prioritizes and meters the delivery of audio messages. FIG. 1 illustrates an exemplary system 10 for implementing a client server messaging system according to one embodiment.

The system 10 includes a plurality of computing devices, including client devices 12-1-12-N (generally, client device 12 or client devices 12). Each of the client devices 12 has a corresponding user 14-1-14-N (generally, user 14 or users 14), each of whom may be both a message sender and a message recipient. The client devices 12 are preferably communicatively coupled to another computing device, such as a message server 16, which facilitates message exchange between the client devices 12. The client devices 12 may comprise any suitable computing device capable of sending and receiving messages, including but not limited to, for example, a smartphone, a computer, a personal digital assistant (PDA), or the like. The message server 16 may comprise any suitable computing device capable of facilitating message exchange as discussed herein, including but not limited to, for example, a computer, workstation, or special-purpose message-processing computing device. Communication between the client devices 12 and the message server 16 is typically via one or more networks 18 which may comprise, for example, any private or public network, or combination thereof, suitable for the exchange of messages between such computing devices.

Each of the client devices 12-1-12-N includes a corresponding messaging module 20-1-20-N (generally, messaging module 20 or messaging modules 20) which implements messaging functionality, as described herein, for the corresponding client device 12. Generally, the messaging module 20 enables a corresponding user 14 to generate an audio message, such as by dictating an audio message, and encodes the audio message into a digital audio file, such as a WAV or MPEG file. In one embodiment, the client devices 12 include encryption technology such that the audio messages are automatically encrypted when sent, and decrypted when received, to ensure privacy. In the context of sending a message, the user 14 is a sending user 14. While the discussion herein relates to audio messages, if the client devices 12 include video functionality, it will be apparent that the messages could include both audio and video. Thus, the phrase audio message encompasses any message that includes audio communications as well as other data, such as video.

The messaging module 20 enables the sending user 14 to attach any desired files to the audio message, and to select one or more desired message recipients from a list of recipient users 14. The sending user 14 is also able to designate one or more sender designated priorities for the audio message. A sender designated priority, as discussed in greater detail herein, is implemented via the assignment by the sender of an attribute value to a sender prioritization attribute associated with an audio message. For example, the sending user 14 may designate a message importance and/or a response urgency identifying how urgently the sending user 14 desires a response. The sending user 14 then indicates that the audio message is to be sent to the recipient user 14 by, for example, selecting a "send" user control or another similar user control. The messaging module 20 communicates the audio message, any attachments, and any sender designated priorities to the message server 16. Sender designated priorities, and other message attributes, may be implemented as metadata associated with an audio message.

The message server 16 receives the audio message, associated metadata, and the attachments, if any. The message server 16 may determine the message recipient, and may access member configuration data 22 associated with the message recipient. As discussed in greater detail herein, the member configuration data 22 identifies one or more recipient prioritization attributes and corresponding attribute priorities. Generally, the recipient prioritization attributes are based at least in part on one or more message attributes of an audio message, such as size, date, sender, or the like. The message server 16 then prioritizes the audio message in relation to other audio messages received for the message recipient based on a combination of the sender designated priority and the recipient prioritization attributes to generate a prioritized message list 24. The prioritized message list 24 may be implemented via any suitable structure, such as a linked list, a queue, or the like.

Assume in this example that the recipient user 14-N is the message recipient associated with the member configuration data 22 and the prioritized message list 24. The client device 12-N requests a subset of prioritized messages from the message server 16. Such request may be made in response to an explicit request for messages by the recipient user 14-N, or may be made periodically by the client device 12-N, or may be made in response to the recipient user 14-N processing the last of a previous subset of messages delivered to the client device 12-N. In response to the request, the message server 16 provides a subset of the audio messages to the client device 12-N based on the prioritized message list 24. The subset of audio messages may comprise a single audio message, or may comprise several audio messages. The recipient user 14-N may then listen to the audio messages in the subset of audio messages, and may respond as appropriate.

In one embodiment, the messaging system may comprise a closed messaging system wherein only users 14 who are configured as participants in the messaging system may send and receive audio messages. Such a closed messaging system may be preferable to an open messaging system, such as that characterized by an email messaging system, to eliminate the inevitable plethora of unwanted messages from strangers. In a closed messaging system, the message server 16 may include a temporary member interface 25 which may allow guests to access the closed messaging system on a temporary basis. For example, a doctor may provide a patient with a URL, or a phone number and access code, which allows the patient to send and receive audio messages from the message server 16 for a predetermined period of time, such as two weeks.

Figure 2:
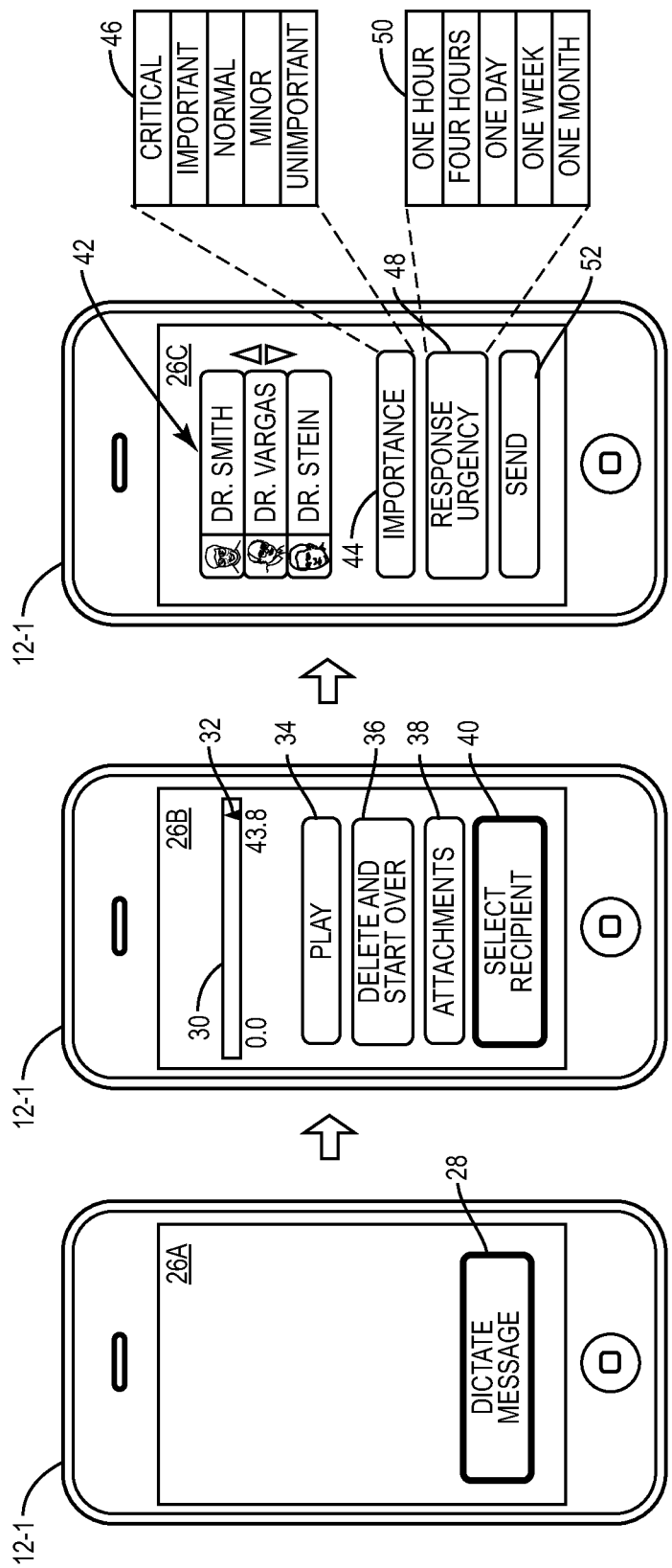
FIG. 2 illustrates exemplary user interfaces which enable a user to generate and send an audio message according to one embodiment.

FIG. 2 illustrates exemplary user interfaces which enable a sending user 14 to generate and send an audio message according to one embodiment. Assume that the user 14-1 is a message sender or initiator, and desires to send an audio message to the user 14-N, who in this context would be the message recipient. Assume further that the client device 12-1 is a smartphone with a touch interface, and the sending user 14-1 initiates on the client device 12-1 the messaging module 20. The client device 12-1 displays, or otherwise renders, a user interface 26A which includes a user control 28 which, when selected by the user 14-1, allows the user 14-1 to dictate a message. After the desired message has been dictated, the client device 12-1 displays a user interface 26B. The user interface 26B includes a user control 30 which contains a message location pointer 32 that allows the user 14-1 to listen to all or a selected portion of the dictated audio message. In particular, the user 14-1 may select the message location pointer 32, slide the message location pointer 32 along the user control 30 to a desired time offset, and select a user control 34 to begin playing, or otherwise rendering, the dictated audio message at the desired time offset. A user control 36 enables the user 14-1 to delete the dictated audio message and dictate a new audio message. A user control 38 enables the user 14-1 to attach one or more files to the audio message. A user control 40 enables the user 14-1 to select the desired recipient.

Upon selection of the user control 40, a user interface 26C may be displayed on the client device 12-1. The user interface 26C includes a scrollable contact list 42 which allows the user 14-1 to select one or more desired recipients. Alternately, the client device 12-1 may maintain a separate contact directory which identifies a plurality of different contacts and may be shared among many applications, such as an email application or the messaging module 20-1, and which is displayed upon selection of the user control 40 to enable the user 14-1 to select any contact identified in the contact directory.

The user 14-1 may also select a user control 44 to designate a sender message importance of the audio message. Upon selection of the user control 44, a popup list 46 identifying a plurality of different sender message importance values may be displayed. The user 14-1 may then designate a desired sender message importance value. Designation of the sender message importance value causes the attribute value of a corresponding sender prioritization attribute to be set accordingly. The user 14-1 may also select a user control 48 to designate a sender response urgency for the audio message. Upon selection of the user control 48, a popup list 50 identifying a plurality of different sender response urgency values may be displayed. The user 14-1 may then designate a desired sender response urgency value. In one embodiment, the user 14-1 may be able to enter, via a soft keyboard, for example, a sender response urgency value that is not displayed in the popup list 50. Designation of the sender response urgency value causes the attribute value of a corresponding sender prioritization attribute to be set accordingly.

Sender message importance and sender response urgency differ from one another. For example, the user 14-1 may want to determine if the user 14-N is available to play golf at a particular tee time on the weekend, and may desire to reserve such tee time as soon as possible before another person reserves the tee time. Thus, the user 14-1 may designate the audio message as having a relatively low sender message importance, but a relatively high sender response urgency. In another situation, the user 14-1 may want to apprise the user 14-N of some relatively bad financial news and thus may designate the audio message as being important, but, recognizing that there is nothing that can be done to alter the news, may designate the response as having a relatively low sender response urgency. The user 14-1 may then select a user control 52 to cause the client device 12-1 to send the audio message, along with any attachments, to the message server 16.

Figure 3:
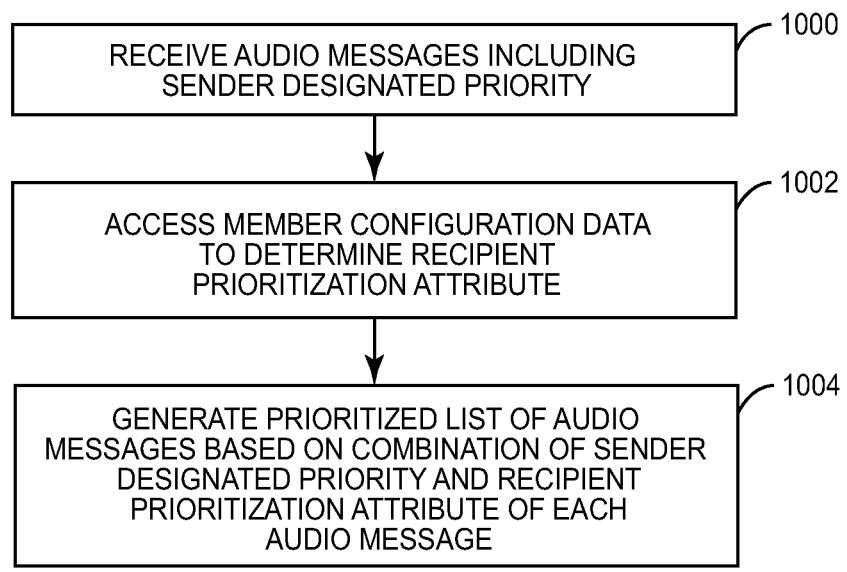
FIG. 3 is a flowchart of an exemplary method for prioritizing audio messages according to one embodiment.

The message server 16 receives the audio message, as well as other audio messages destined for the message recipient. FIG. 3 is a flowchart of an exemplary process for prioritizing audio messages according to one embodiment.

The message server 16 receives a plurality of audio messages destined for the message recipient (step 1000). Each of the audio messages preferably includes a sender designated priority, such as a sender importance attribute value or sender response urgency attribute value. By "includes," it is meant that the audio message is accompanied with the sender designated priority in one manner or another. The precise manner by which the audio message is accompanied with the sender designated priority may differ among messaging systems. In one embodiment, each audio message includes message attributes that correspond to sender designated priorities, such as a sender importance message attribute and/or a sender response urgency message attribute, whose values may be set by the sending client device 12-1 in response to the user 14-1 selecting a particular sender importance value and sender response urgency value from the pop-up lists 46 and 50, respectively.

Upon receipt of an audio message, the message server 16 accesses the member configuration data 22 associated with the message recipient to whom the audio message is destined (step 1002). The member configuration data 22 identifies one or more recipient prioritization attributes and corresponding attribute priorities. As discussed in greater detail herein, a recipient prioritization attribute is based on a message attribute of the audio message. The message server 16 then generates a prioritized list of audio messages based on a combination of the sender designated priority and a recipient prioritization attribute of each audio message (step 1004).

Figure 4:
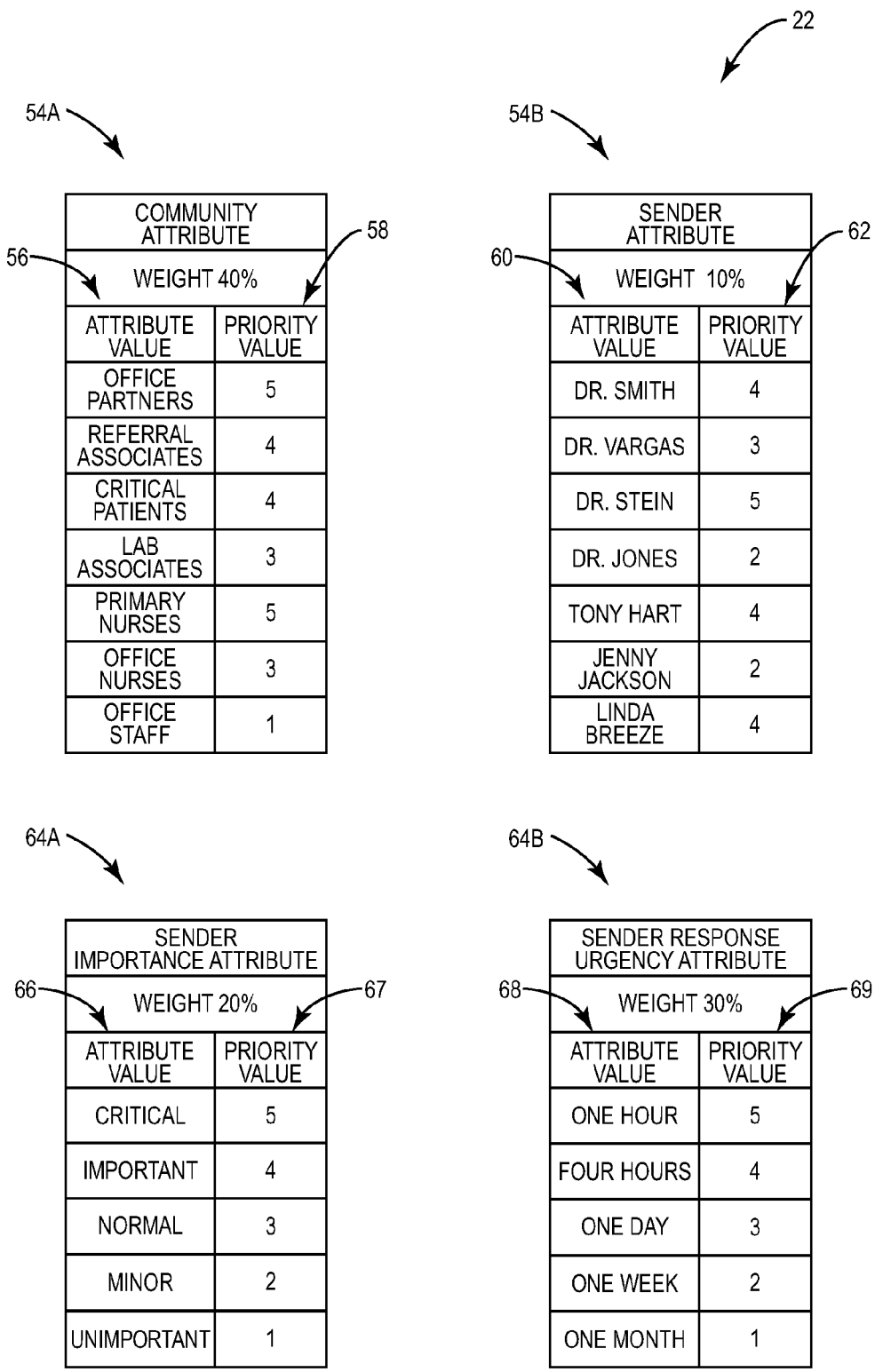
FIG. 4 is a block diagram illustrating exemplary member configuration data for a particular recipient according to one embodiment.

FIG. 4 is a block diagram illustrating exemplary member configuration data 22 for a particular message recipient according to one embodiment. The member configuration data 22 includes one or more recipient prioritization attributes 54 (in this example, 54A and 54B). A recipient prioritization attribute 54 is based, at least in part, on a message attribute of an audio message, and is used by the recipient as the basis for prioritizing the prioritized message list 24. A recipient prioritization attribute 54 differs from a sender designated priority in that a recipient prioritization attribute is based on a message attribute whose value is not specifically designated by the sender of the audio message. While only two recipient prioritization attributes 54 are illustrated, the messaging system may include any number of recipient prioritization attributes 54.

The recipient prioritization attribute 54A is an example of a recipient prioritization attribute that is derived from a message attribute. The recipient prioritization attribute 54A is a community attribute that identifies a particular community of interest with which the sender of the audio message is associated, and is based on a sender attribute of an audio message, which identifies the sender of the audio message. Each recipient user 14 may define one or more communities and identify which sending users 14 are members of which communities. Alternately, a system administrator may define the communities and corresponding membership. Representative exemplary attribute values of the community attribute are illustrated in value column 56, and may include, for example, an "Office Partners" community, which may comprise those individuals who are partners in a business; a "Primary Nurses" community, which may comprise those individuals who are primary nurses; and the like. The recipient user 14 can preferably identify a particular priority value for each attribute value of a recipient prioritization attribute. For example, as indicated in the priority column 58, the recipient user 14 in this example has accorded the "Office Partners" community a priority of 5, the highest priority value. The recipient user 14 has accorded the "Referral Associates" community a priority value of 4.

The recipient prioritization attribute 54B is an example of a recipient prioritization attribute that is based directly on a message attribute. In this example, the recipient prioritization attribute 54B identifies the sender attribute of each audio message as a recipient prioritization attribute. The recipient user 14 may assign each sending user 14 a corresponding priority value. For example, as indicated in the value column 60 and priority column 62, the recipient user 14 has designated Dr. Stein the highest priority value, 5, and Dr. Jones a relatively low priority value, 2. Any sending user 14 not identified in the value column 60 may be accorded a default priority value.

Preferably, the prioritization of audio messages is based on both the sender designated priority and the recipient prioritization attribute. In one embodiment, an aggregate message priority value is determined for each audio message based on criteria including the sender designated priority and the recipient prioritization attribute. The aggregate message priority value may take into consideration weightings for the various criteria, such that certain criteria affect prioritization more than others. For example, assume that two criteria are used in the prioritization of an audio message, and each may have a priority value that ranges from 5 to 1, wherein 5 is the highest priority value and 1 is the lowest priority value. The two criteria are a sender designated priority and a recipient prioritization attribute. Prioritization of audio messages may be in accordance with the following formula:

$$\text{Aggregate message priority value} = (C1) \times 40\% + (C2) \times 60\% \quad (1)$$

wherein C1=sender prioritization attribute priority value; C2=recipient prioritization attribute priority value; 40% is the weight accorded to the sender prioritization attribute; and 60% is the weight accorded to the recipient prioritization attribute.

In the example illustrated in FIG. 4, the recipient user 14 has indicated that the recipient prioritization attribute 54A (i.e., community) has a weight of 40%, and the recipient prioritization attribute 54B (i.e., sender) has a weight of 10%.

The member configuration data 22 may also identify sender prioritization attributes 64 (in the current example, sender prioritization attributes 64A and 64B). A sender prioritization attribute 64 is a message attribute that identifies a priority of the audio message based on the sender's perspective, the priority being specifically designated by the sender. In one embodiment, the sender prioritization attribute 64A is a sender importance attribute which identifies the importance of the audio message from the sender's perspective. The attribute value column 66 indicates that exemplary values of the sender importance attribute include "Critical," "Important," "Normal," "Minor," and "Unimportant." The priority value column 67 indicates priority values which correspond to the exemplary sender importance attribute values. The sender prioritization attribute 64B is a sender response urgency attribute which identifies the response urgency from the sender's perspective. The attribute value column 68 indicates that exemplary values of the sender response urgency attribute include "One Hour," "Four Hours," "One Day," "One Week," and "One Month." The priority value column 69 indicates priority values which correspond to the exemplary sender response urgency attribute values.

In one embodiment, the recipient user 14 may also be able to designate weights for the sender prioritization attributes 64. In this example, the recipient user 14 has indicated that the sender prioritization attribute 64A (i.e., sender importance attribute) has a weight of 20%, and the sender prioritization attribute 64B (i.e., sender response urgency attribute) has a weight of 30%.

While the prioritization of audio messages is based on at least one sender designated priority and one recipient prioritization attribute, the prioritization may include additional sender designated priorities and additional recipient prioritization attributes. For example, assume that the recipient user 14 wished to prioritize audio messages based on all of recipient prioritization attributes 54A and 54B and sender prioritization attributes 64A and 64B. Based on the member configuration data 22 illustrated in FIG. 4, the following formula may be used to prioritize audio messages for this exemplary recipient user 14:

$$\text{Aggregate message priority value} = (C1) \times 40\% + (C2) \times 10\% + (C3) \times 20\% + (C4) \times 30\% \quad (2)$$

wherein $C1$=community attribute priority value; $C2$=sender attribute priority value; $C3$=sender importance attribute priority value; and $C4$=sender response urgency attribute priority value.

As an example for determining an aggregate message priority value for an audio message, assume Dr. Smith sends an audio message to the recipient user 14 and is a member of the Office Partners community. Assume further that Dr. Smith designates a sender importance of "Important" and a sender response urgency of "Four Hours." The aggregate message priority value for the audio message may be determined in accordance with formula (2) in the following manner:

$$\text{Aggregate message priority value} = 5 \times 40\% + 4 \times 10\% + 4 \times 20\% + 4 \times 30\%$$

$$\text{Aggregate message priority value} = 4.4$$

Audio messages are preferably delivered to the recipient user 14 in a metered manner. In particular, preferably only a subset of audio messages is provided to a client device 12 at one time. In one embodiment, the subset may comprise only a single audio message. Alternately, the subset may comprise a relatively small number of audio messages, such as three or five audio messages. The number of messages in a subset may be configured by a system administrator, or may be user configurable, up to a maximum number. The number of audio messages in a subset for a particular recipient user 14 will be referred to herein as the subset size. For example, if the subset of audio messages includes a single audio message, the subset size is one; if the subset of audio messages includes three audio messages, the subset size is three.

Figure 5:
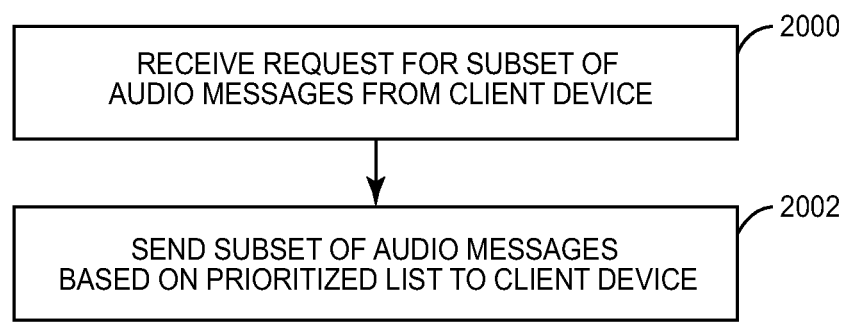
FIG. 5 is a flowchart of an exemplary method for delivering a subset of audio messages to a client device according to one embodiment.

FIG. 5 is a flowchart of an exemplary process for delivering a subset of audio messages to a client device 12 according to one embodiment. The message server 16 receives a request from a client device 12 for a subset of audio messages (step 2000). The message server 16 accesses the prioritized message list 24 and selects the subset size of audio messages from the top of the prioritized message list 24. In particular, the message server 16 accesses the prioritized message list 24 to select the highest priority audio message(s). The message server 16 sends the subset of the audio message(s) to the client device 12 (step 2002). In one embodiment, the message server 16 may also send corresponding prioritization information that identifies priorities associated with the respective audio message to the client device 12. For example, the prioritized message list 24 may contain, for each audio message in the prioritized message list 24, the aggregate message priority value, the sender prioritization attribute priority value, and the recipient prioritization attribute priority value used to prioritize the prioritized message list 24.

In one embodiment, as an audio message is processed by the recipient user 14, the client device 12 sends data to the message server 16 indicating that the particular audio message has been processed. Processing of a message may comprise, for example, deleting the message on the client device 12, replying to the audio message, delegating the audio message to a delegate, or the like. Upon such an event, the client device 12 may send a message that identifies the particular audio message by a unique identifier to the message server 16. Upon receipt of the message, the message server 16 may remove the audio message from the prioritized list.

Figure 6:
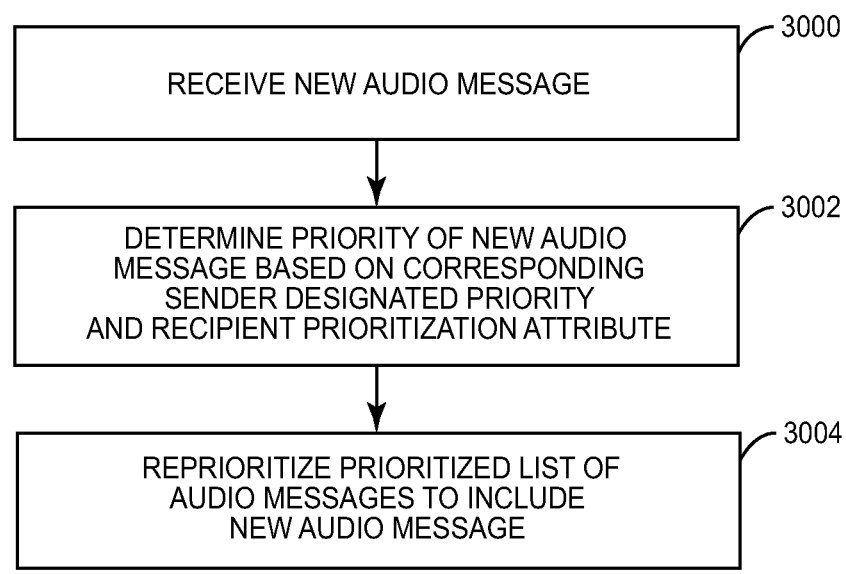
FIG. 6 is a flowchart of an exemplary method for reprioritizing the prioritized message list according to one embodiment.

Preferably, the prioritized message list 24 is continually and dynamically reprioritized upon receipt of each new audio message. FIG. 6 is a flowchart of an exemplary process for reprioritizing the prioritized message list 24 according to one embodiment. The message server 16 receives a new audio message destined for a recipient from a sender (step 3000). An aggregate message priority value of the new audio message is determined based on at least a corresponding sender designated priority and a recipient prioritization attribute (step 3002). The prioritized message list 24 is then reprioritized to include the new audio message (step 3004). Consequently, each time the client device 12 requests the subset of audio messages, the subset that is provided to the client device 12 contains the highest priority audio messages at the time of the request. This may result in certain audio messages that have already been provided to the client device 12 at a first point in time being superseded by other audio messages at a second point in time even though the audio messages provided at the first point in time have not been processed by the user 14.

For example, assume that at time 01:00 a subset of the three highest priority audio messages A, B, and C is provided to the client device 12 in response to a request from the client device 12 for the next subset of audio messages. Assume further that new audio messages R and S arrive at the message server 16 at time 01:03, and after being prioritized, are higher priority than the audio messages A, B, and C, such that the top five messages on the prioritized list are now R, S, A, B, and C. Assume further that the user 14 did not process any of the audio messages A, B, and C, but requests the next subset of audio messages at time 01:05. In response, the message server 16 provides to the client device 12 a subset of audio messages comprising audio messages R, S, and A, since such audio messages are now the audio messages at the top of the prioritized message list 24 of audio messages. The audio messages B and C remain on the prioritized message list 24, but have moved down the prioritized list based on the dynamic reprioritization of the list upon receipt of audio messages R and S.

Figure 7:
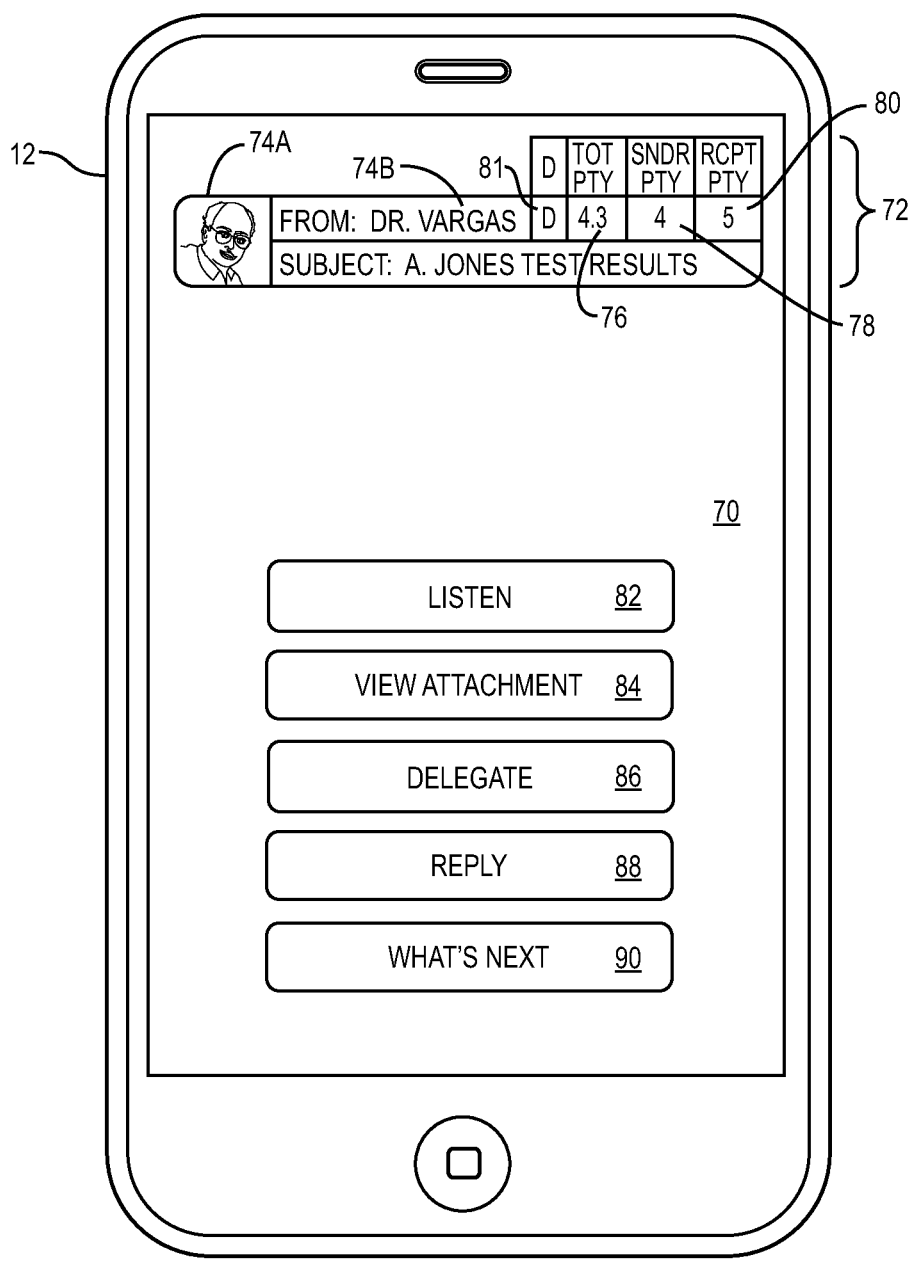
FIG. 7 illustrates an exemplary user interface that may be displayed on a client device of a recipient user according to one embodiment.

FIG. 7 illustrates an exemplary user interface 70 that may be displayed on a client device 12 of a recipient user 14. The user interface 70 includes a message area 72 which provides information about each audio message in a subset of audio messages received by the client device 12. In this example, the subset size is one audio message. Exemplary information provided in the message area 72 may include one or more sender identifiers 74A, 74B, which may comprise textual, graphical, or other indicia identifying the sender of a respective audio message. In this example, the sender identifier 74B textually identifies the sending user 14 as Dr. Vargas, and the sender identifier 74A is a thumbnail image of Dr. Vargas. The message area 72 may also include prioritization indicia regarding the audio message.

A message area 76 displays an aggregate message priority indicium indicative of the aggregate message priority value of 4.3 based on the sender designated priority and the recipient prioritization attribute. Assume the recipient user 14 has weighted the sender designated priority to be 70% of the aggregate message priority value and the recipient prioritization attribute to be 30% of the aggregate message priority value. A sender priority indicium indicative of the sender designated priority is identified in a message area 78, and a recipient priority indicium indicative of a recipient prioritization attribute priority value is identified in the message area 80.

As discussed below in greater detail, an audio message may be delegated by a delegator user 14 to a delegate user 14. In one embodiment, the message area 72 may include a delegate indicia message area 81 indicating whether the respective audio message has been delegated to the user 14 of the client device 12. In this example, the delegate indicia message area 81 contains a message delegation indicium (i.e., the letter "D") that indicates that the respective message has been delegated to the user 14 of the client device 12.

Although the priority indicia illustrated in FIG. 7 comprise numeric indicia identifying numeric priority values, other priority indicia could be used to distinguish between different priorities, such as colors, letters, or the like. For example, red could indicate relatively high priority, yellow could indicate medium priority, and blue could indicate low priority. In another embodiment, the letter H could indicate relatively high priority, the letter M could indicate medium priority, and the letter L could indicate low priority. In another embodiment, no priority information may be disclosed, and the audio messages may merely be presented in the user interface 70 in order of aggregate message priority value corresponding to the displayed audio messages.

The user interface 70 may also include a user control 82 which, when selected by the recipient user 14, begins playing a selected audio message. In the example illustrated in FIG. 7, wherein information regarding only a single audio message is presented in the user interface 70, selection of the audio message may not be necessary. The user interface 70 may also include a user control 84 which enables the recipient user 14 to view any attachments that may have accompanied the audio message. If such an attachment exists, the message area 72 may indicate the existence of an attachment. The user interface 70 may also include a user control 86 that allows the recipient user 14 to delegate the message to a delegate user 14. This feature will be discussed in greater detail herein. In one embodiment, an audio message that has been delegated to a delegate user 14 may be further delegated by the delegate user 14 to another delegate user 14. A user control 88 may provide a means for replying to the sending user 14, and if the user control 88 is selected, the client device 12 may display, for example, the user interface 26A illustrated in FIG. 2. A user control 90, if selected, causes the client device 12 to request another subset of audio messages from the message server 16.

Figure 8:
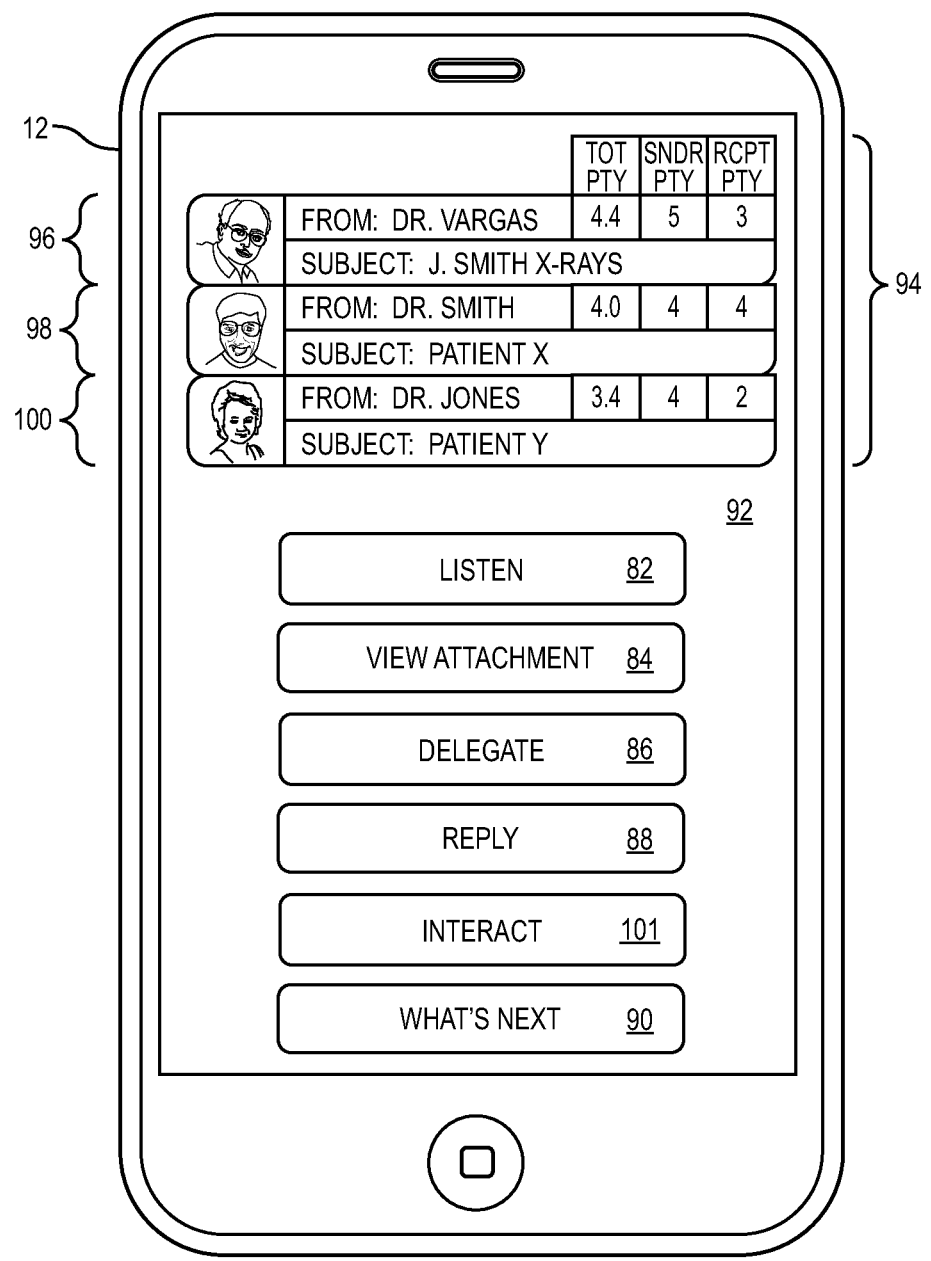
FIG. 8 illustrates another exemplary user interface that may be displayed on a client device of a recipient user, wherein the subset size is greater than one audio message.

FIG. 8 illustrates another exemplary user interface 92 that may be displayed on a client device 12 of a recipient user 14, wherein the subset size is greater than one audio message. In this example, a message area 94 contains information about three audio messages 96-100, and thus the subset size is three audio messages. As discussed with regard to FIG. 7, exemplary information about each audio message 96-100 may include a sender identifier, an aggregate message priority indicium indicative of an aggregate message priority value, a sender priority indicium indicative of a sender designated priority, and a recipient priority indicium indicative of a recipient prioritization attribute priority value, for example. Assume again that the recipient user 14 has weighted the sender designated priority to be 70% of the aggregate message priority value and the recipient prioritization attribute to be 30% of the aggregate message priority value. In an alternative embodiment, the aggregate message priority value of each audio message may not be provided, and it may simply be assumed that the audio message at the top of the user message area 94, in this example, the audio message 96, has a higher aggregate message priority value than the audio message 98, which in turn has a higher aggregate message priority value than the audio message 100. The user controls 82-90 may function as discussed with regard to FIG. 7, except that prior to selecting any user control 82-90, the user 14 may first select, for example by touching, a particular one of the audio messages 96-100.

In one embodiment, the message server 16 may store presence information which identifies a presence status of one or more users 14. For example, the message server 16 may contain presence information that indicates that a user 14 is available for a discussion. Presence information corresponding to the senders of audio messages may be provided to the client device 12 along with the subset of audio messages, or may be periodically provided to the client device 12 as the presence information on the message server 16 changes, so that the client device 12 remains synchronized with the message server 16.

In one embodiment, if the recipient user 14 selects one of the audio messages 96-100 that was sent by a sending user 14 who, at the time of the selection of the audio message, has a presence status of "Available," the client device 12 may display a user control 101, which indicates to the recipient user 14 that the corresponding sending user 14 is available for a discussion. Selection of the user control 101 may initiate a telephone call or other interactive media session, for example, between the recipient user 14 and the sending user 14.

Figure 9:
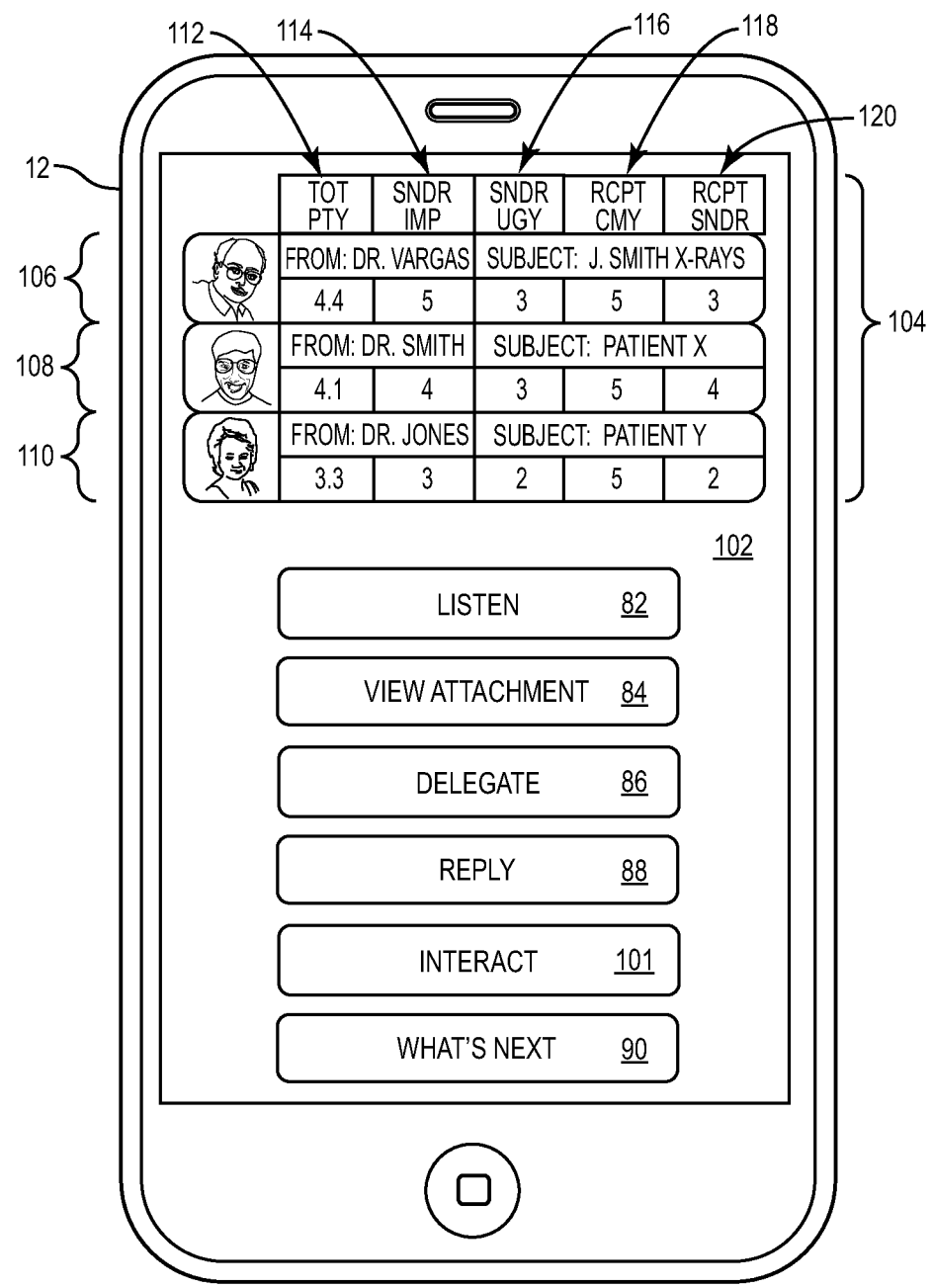
FIG. 9 illustrates another exemplary user interface that may be displayed on a client device of a recipient user.

FIG. 9 illustrates another exemplary user interface 102 that may be displayed on a client device 12 of a recipient user 14. In this embodiment, a message area 104 contains information about three audio messages 106-110, including priority indicia indicative of two sender designated priorities and two recipient prioritization attribute priority values. Assume again that the recipient user 14 has weighted the sender importance attribute to be 40% of the aggregate message priority value, the sender response urgency attribute to be 20% of the aggregate message priority value, the community attribute to be 30% of the aggregate message priority value, and the sender attribute to be 10% of the aggregate message priority value. A column 112 provides priority indicia indicative of the aggregate message priority value for each of the audio messages 106-110. A column 114 provides priority indicia indicative of the sender importance attribute priority value for each of the audio messages 106-110. A column 116 provides priority indicia indicative of the sender response urgency attribute priority value for each of the audio messages 106-110. A column 118 provides priority indicia indicative of the community attribute priority value as designated by the respective recipient user 14. A column 120 provides priority indicia indicative of the sender attribute priority value as designated by the respective recipient user 14.

As discussed previously, rather than numeric priority indicia, other priority indicia, such as a textual identifier that corresponds to the attribute priority value, may be provided. For example, the sender importance attribute priority value associated with the audio message 106 may be displayed as "Critical" rather than shown as the number 5. Similarly, the sender response urgency attribute value associated with the audio message 106 may be displayed as "One Day" rather than shown as the number 3. The community attribute priority value associated with the audio message 106 may be displayed as "Office Partners" rather than the number 5.

Figure 10:
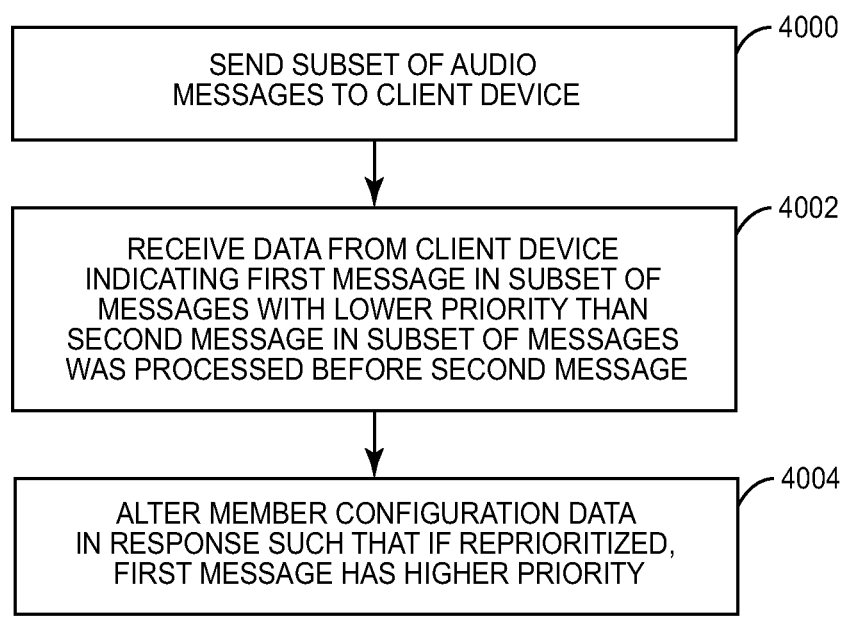
FIG. 10 is a flowchart of an exemplary method for heuristically modifying the member configuration data according to one embodiment.

In one embodiment, the message server 16 may heuristically modify the member configuration data 22 based on information received from the client device 12 regarding the manner in which the audio messages provided to the recipient user 14 were processed. FIG. 10 is an exemplary flowchart illustrating a process for heuristically modifying the member configuration data 22 according to one embodiment. FIG. 10 will be discussed in conjunction with FIG. 9. The message server 16 sends a subset of audio messages to the client device 12 (step 4000). Assume that the subset of audio messages comprises the audio messages 106-110 illustrated in FIG. 9. Assume further that the recipient user 14 processes the audio message 108 prior to processing the audio message 106, even though the audio message 106 has a higher aggregate message priority value than the audio message 108. For example, the recipient user 14 listens to or delegates the audio message 108 prior to the audio message 106. The client device 12 sends the message server 16 a message indicating that the recipient user 14 processed the audio message 108 prior to processing the audio message 106 (step 4002). In response, the message server 16 may automatically alter the member configuration data 22 such that the audio message 108, if reprioritized, would have a higher priority than the priority of the audio message 108 prior to the alteration (step 4004). For example, the message server 16 may alter the sender attribute (recipient prioritization attribute 54B) such that the priority value for Dr. Smith is a 5 rather than a 4. Thus, if reprioritized, the audio message 108 would have an aggregate message priority value of 4.2 rather than 4.1.

In another embodiment, the message server may not alter the member configuration data 22 upon receipt of a single notification that the user 14 processed an audio message in an order that is different from the priority of the audio messages, but instead may maintain usage statistics generated over multiple observations of such events, and adjust the member configuration data 22 upon determination of repetitive patterns.

Figure 11:
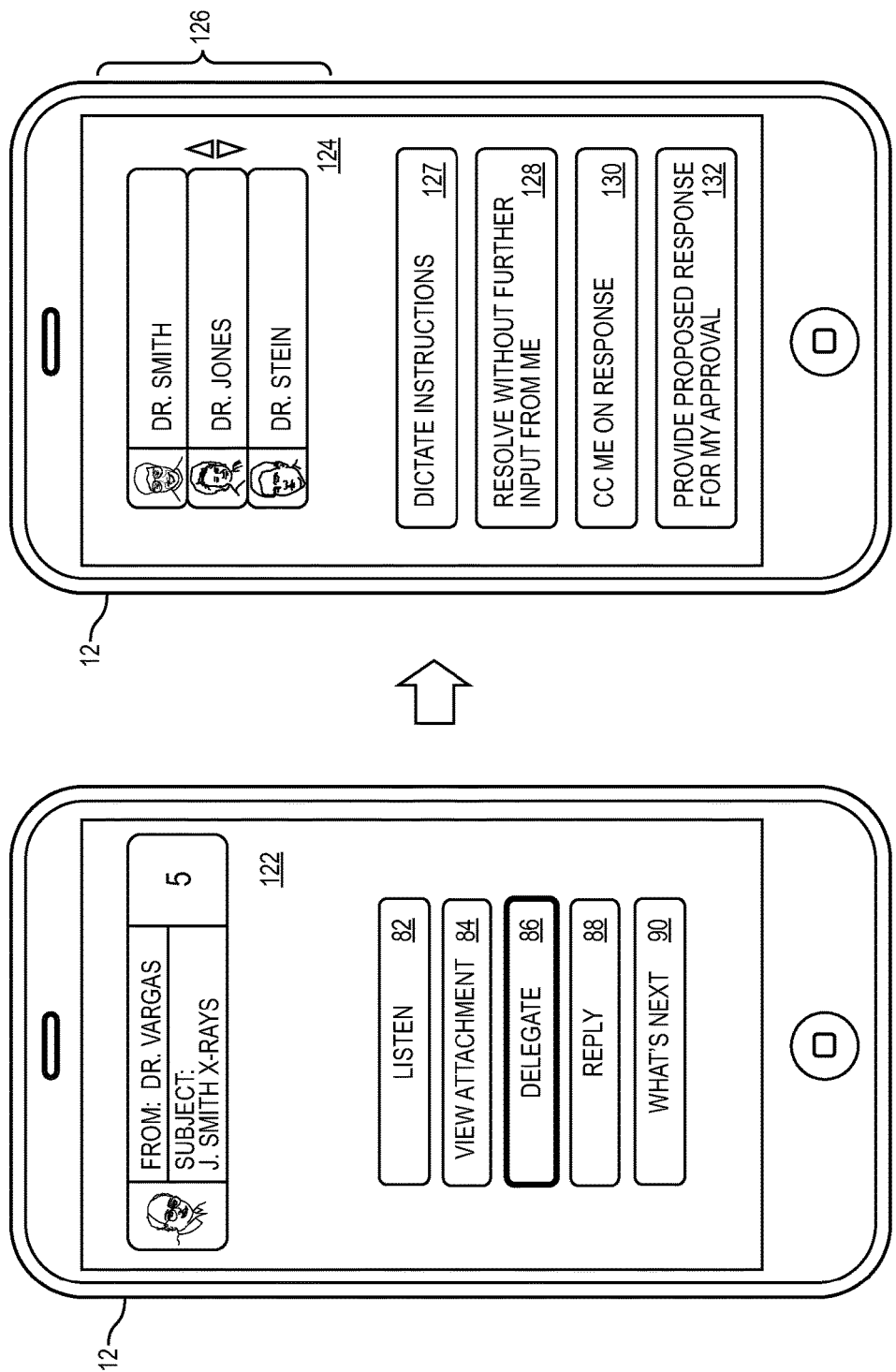
FIG. 11 illustrates exemplary user interfaces which enable a recipient user to delegate a message response to a delegate.

FIG. 11 illustrates exemplary user interfaces which enable a recipient user 14 to delegate a message response to a delegate user 14. With respect to FIGS. 11 and 12, the recipient user 14 who delegates a message will be referred to as a delegator user 14. For purposes of illustration only, it will be assumed that the subset size is one audio message. A user interface 122 is displayed on the client device 12 which includes the user control 86 which, when selected, may cause a user interface 124 to be displayed on the client device 12. The user interface 124 may include a contacts list area 126 which enables the delegator user 14 to scroll through a list of contacts stored on the client device 12. The user interface may include a user control 127 that enables the user 14 to optionally dictate instructions to the delegate user 14 regarding the delegation of the audio message to the delegate user 14.

The delegator user 14 may select one of three user controls 128-132 to cause the audio message to be delegated to the selected contact, along with a particular delegation action, and any instructions that were dictated by the delegator user 14. The user control 128 causes the audio message to be delegated to the selected contact and identifies a delegation action directing the delegate user 14 (i.e., the selected contact) to generate a response to the audio message and to send the response to the sending user 14 (i.e., Dr. Vargas in this example), without notifying the delegator user 14. The user control 130 causes the audio message to be delegated to the selected contact and identifies a delegation action directing the delegate user 14 to generate a response to the audio message and to send the response to the sending user 14, and also to the delegator user 14. The user control 132 causes the audio message to be delegated to the selected contact and identifies a delegation action directing the delegate user 14 to generate a response to the audio message which is to be provided to the delegator user 14 for approval, prior to sending the response to the sending user 14.

In particular, selection of any of the user controls 128-132 causes the client device 12 to communicate the identity of the selected delegate user 14, such as via a delegate identifier identifying the selected contact, and a particular delegation action to the message server 16. The delegated audio message may also be communicated to the message server 16, or a unique identifier identifying the delegated audio message may be provided to the message server 16 if the message server 16 retains copies of the audio messages that are delivered to the users 14. In turn, the message server 16 communicates the delegated audio message in conjunction with the particular delegation action to the delegate user 14.

In one embodiment, the delegator user 14 may configure the client device 12 to automatically delegate an audio message to a predetermined delegate user 14 based on one or more message attributes associated with the audio message. For example, the delegator user 14 may configure the client device 12 to delegate any audio message from Dr. Vargas having a sender importance attribute priority value of less than "Important" and having a sender response urgency attribute priority value higher than "One Day" to a particular primary nurse delegate user 14, along with the delegation action directing the respective primary care nurse to generate a response and send the response to the sending user 14 and a copy of the response to the delegator user 14. Alternately, such automatic delegation information may be stored on the message server 16, and the message server 16 may perform the automatic delegation of messages in accordance with the automatic delegation information.

In another embodiment, the client device 12 may be configured to automatically select a delegate user 14 based on one or more message attributes of an audio message, but may then request that the delegator user 14 manually specify the particular delegation action. In yet another embodiment, the client device 12 may be configured to automatically select a delegation action based on one or more message attributes of an audio message, but may then request that the delegator user 14 manually specify the particular delegate user 14.

As discussed previously, the user interface of the client device 12 of the delegate user 14 who receives a delegated audio message may include delegation indicia, such as the letter "D" or the like, to visually identify the audio message as a delegated audio message and to easily visually distinguish such messages from audio messages that are not delegated audio messages. Message delegation is preferably system enforced, such that a delegate user 14 is presented with options that are consistent with the particular delegation action associated with a delegated audio message. For example, the message server 16 or client device 12 of a delegate user 14 may automatically cause a copy of a response to be sent to a delegator of the audio message if the delegation action directed the delegate user 14 to copy the delegator on the response. The message server 16 or client device 12 may preclude a delegate user 14 from sending a response to an audio message directly to the sending user 14 of the audio message if the delegation action directed the delegate user 14 to provide a response to the delegator user 14 for the delegator's approval.

In one embodiment, after the delegate user 14 has generated a response to a delegated message, the user interface on the client device 12 gives the delegate user 14 only a single option to provide the response to the message server 16, which then processes the response according to the delegation action. For example, if the delegation action directs the delegate to generate a response and send the response to the sender without notifying a delegator, the message server 16 receives the response from the delegate user 14 and sends the response to the sender 14. If the delegation action directs the delegate to generate the response and send the response to both the sender and the delegator, the message server 16 receives the response from the delegate user 14 and sends the response to the sender 14 and to the delegator user 14. If the delegation action directs the delegate to generate the response and send the response to the delegator, the message server 16 receives the response from the delegate user 14 and sends the response to the delegator user 14.

While certain user interfaces have been illustrated herein for purposes of discussion, it should be apparent that the embodiments disclosed herein are not limited to such user interfaces, and that many different user interfaces could be used to implement the user functionality disclosed herein.

Figure 12:
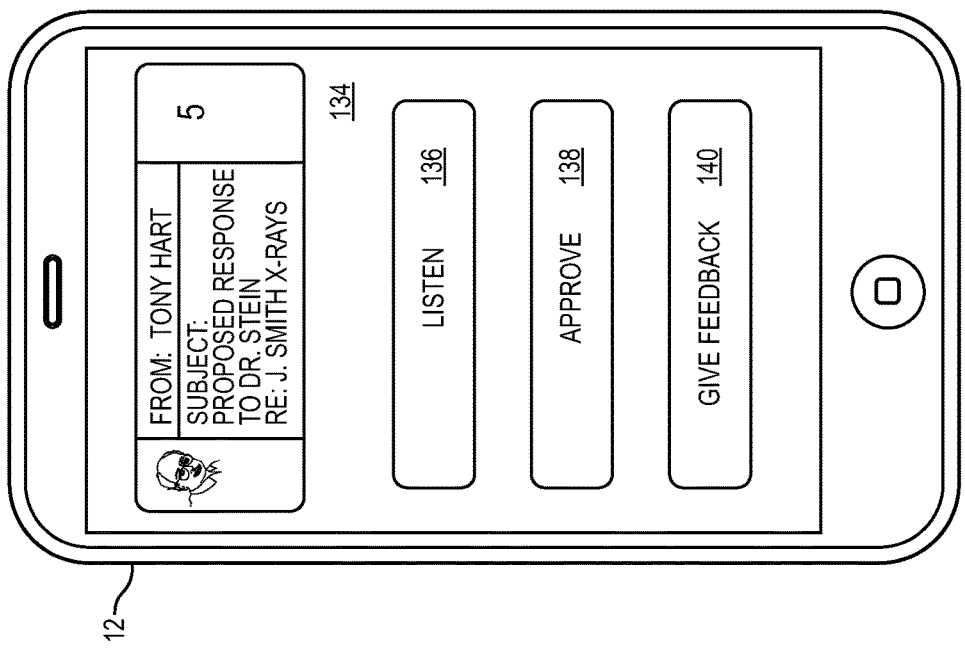
FIG. 12 is a block diagram of an exemplary user interface displayed on a client device of a delegator user when the user receives a response from a delegate that requires the approval of the user.

FIG. 12 is a block diagram of an exemplary user interface 134 displayed on a client device 12 of a delegator user 14 when the delegator user 14 receives a response from a delegate user 14 that requires the approval of the delegator user 14. The user interface 134 may include a user control 136 which enables the delegator user 14 to listen to the proposed response. In this example, the delegator user 14 has delegated an audio message from Dr. Stein to Tony Hart. A user control 138, if selected, indicates that the delegator user 14 approves the proposed response from Tony Hart, and causes the client device 12 to send the proposed response to Dr. Stein. A user control 140 enables the delegator user 14 to generate a new audio message which includes feedback to Tony Hart regarding the proposed response. The user 14 may select the user control 140 when, for example, the delegator user 14 is not satisfied with the proposed response.

Figure 13:
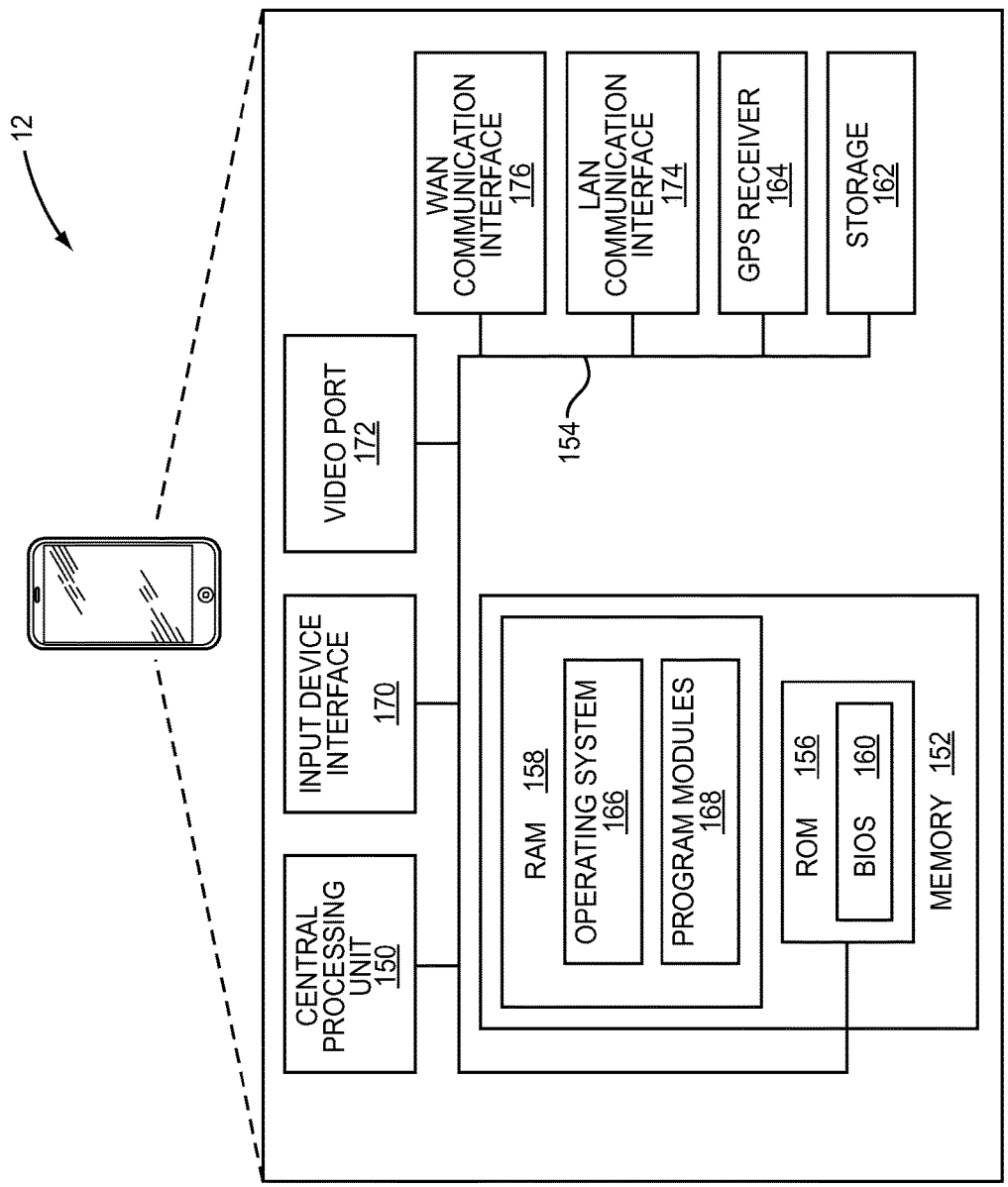
FIG. 13 is a block diagram of an exemplary client device according to one embodiment.

FIG. 13 is a block diagram of an exemplary client device 12 according to one embodiment. The client device 12 may comprise, for example, a laptop computer, a cellular phone or smartphone, a personal digital assistant (PDA), an Apple® iPad™, or the like. In addition to components discussed previously herein, the exemplary client device 12 may also include a processor, such as a central processing unit 150; a system memory 152; and a system bus 154. The system bus 154 provides an interface for system components including, but not limited to, the system memory 152 and the central processing unit 150. The central processing unit 150 can be any of various commercially available or proprietary processors.

The system bus 154 may be any of several types of bus structures that may further interconnect to a memory bus (with or without a memory controller), a peripheral bus, and/or a local bus using any of a variety of commercially available bus architectures. The system memory 152 may include non-volatile memory 156 (e.g., read only memory (ROM), erasable programmable read only memory (EPROM), electrically erasable programmable read only memory (EEPROM), etc.) and/or volatile memory 158 (e.g., random access memory (RAM)). A basic input/output system (BIOS) 160 may be stored in the non-volatile memory 156, and can include the basic routines that help to transfer information between elements within the client device 12. The volatile memory 158 may also include a high-speed RAM such as static RAM for caching data.

The client device 12 may further include a storage 162, which may comprise, for example, an internal hard disk drive (HDD) (e.g., enhanced integrated drive electronics (EIDE) or serial advanced technology attachment (SATA)) for storage, flash memory, or the like. The drives and associated computer-readable and computer-usable media provide non-volatile storage of data, data structures, computer-executable instructions, and so forth. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods disclosed herein.

The client device 12 may include a global positioning system (GPS) receiver 164 which enables the client device 12 to determine its location. A number of program modules can be stored in the drives and in the volatile memory 158, including an operating system 166 and one or more program modules 168, which may implement the functionality described herein in whole or in part, including, for example, functionality associated with communicating with the message server 16 and the messaging module 20. All or a portion of the embodiments may be implemented as a computer program product, such as a computer-usable or computer-readable medium having a computer-readable program code embodied therein. The computer-readable program code can include software instructions for implementing the functionality of the embodiments described herein when executed on the central processing unit 150. The central processing unit 150, in conjunction with the program modules 168 in the volatile memory 158, may serve as a control system for the client device 12 that is configured to, or adapted to, implement the functionality described herein.

A user may be able to enter commands and information into the client device 12 through one or more input devices, such as, for example, a touch sensitive display; a keyboard (not illustrated); or a pointing device, such as a mouse (not illustrated). Other input devices (not illustrated) may include a microphone, an infrared (IR) remote control, a joystick, a game pad, a stylus pen, or the like. These and other input devices are often connected to the central processing unit 150 through an input device interface 170 that is coupled to the system bus 154, but can be connected by other interfaces such as a parallel port, an IEEE 1394 serial port, a game port, a universal serial bus (USB) port, an IR interface, etc.

The client device 12 may drive a separate or integral display, which may also be connected to the system bus 154 via an interface, such as a video port 172. The client device 12 preferably includes a LAN communication interface 174 for communicating with a wireless LAN or wireless personal area network technology, including, for example, Wi-Fi®, Bluetooth®, or ZigBee®. The client device 12 may also include a WAN communication interface 176 for communicating with the message server 16 via one or more desired WAN technologies, such as, for example, 3G or 4G data telecommunications technologies.

Figure 14:
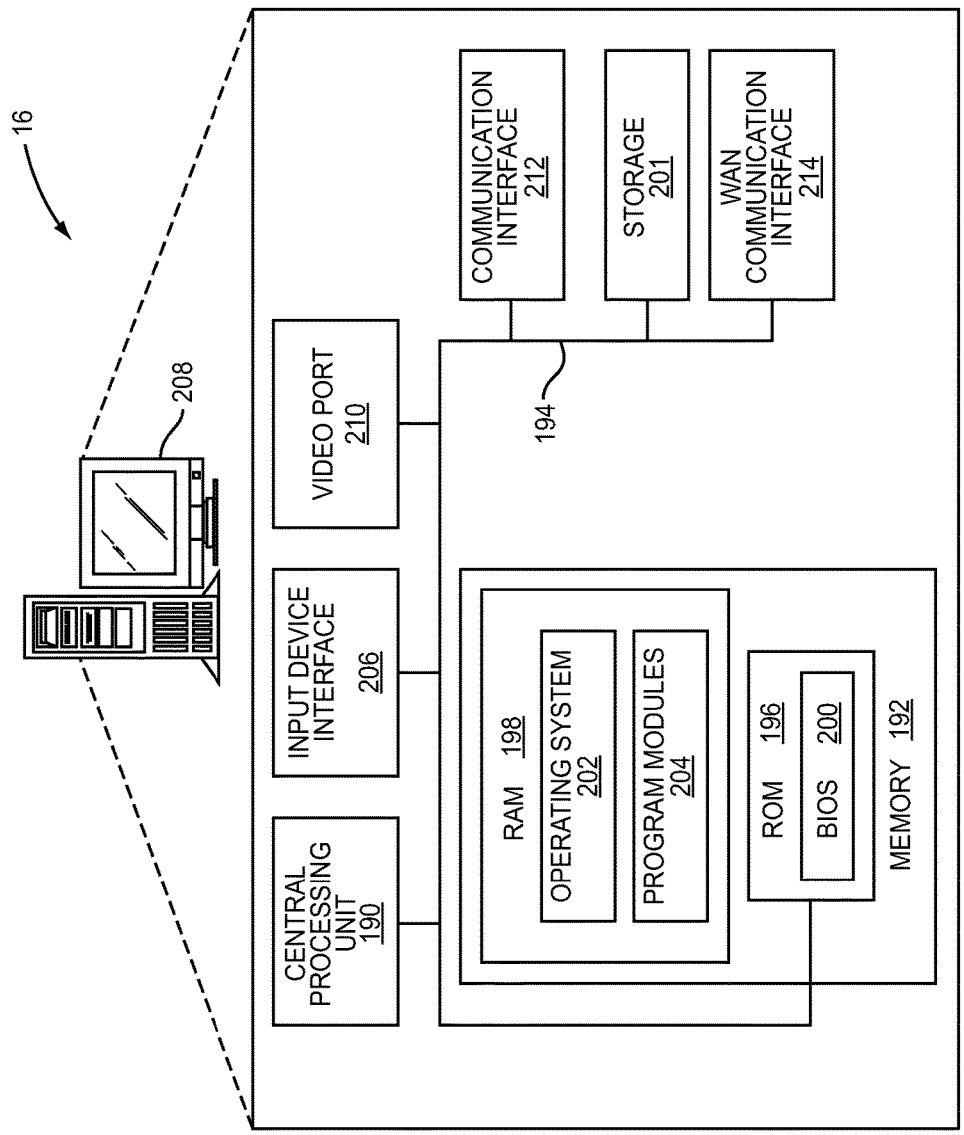
FIG. 14 illustrates an exemplary message server according to one embodiment.

FIG. 14 illustrates an exemplary message server 16 according to one embodiment. The message server 16 may comprise, for example, a laptop computer, a desktop computer, a workstation, a proprietary mainframe computer, a telecommunications switch, or the like. In addition to components discussed previously herein, the exemplary message server 16 may also include a processor, such as a central processing unit 190, a system memory 192, and a system bus 194. The system bus 194 provides an interface for system components including, but not limited to, the system memory 192 and the central processing unit 190. The central processing unit 190 can be any of various commercially available or proprietary processors. Dual microprocessors and other multi-processor architectures may also be employed as the central processing unit 190.

The system bus 194 may be any of several types of bus structures that may further interconnect to a memory bus (with or without a memory controller), a peripheral bus, and/or a local bus using any of a variety of commercially available bus architectures. The system memory 192 may include non-volatile memory 196 (e.g., read only memory (ROM), erasable programmable read only memory (EPROM), electrically erasable programmable read only memory (EEPROM), etc.) and/or volatile memory 198 (e.g., random access memory (RAM)). A basic input/output system (BIOS) 200 may be stored in the non-volatile memory 196, and can include the basic routines that help to transfer information between elements within the message server 16. The volatile memory 198 may also include a high-speed RAM such as static RAM for caching data.

The message server 16 may further include a computer-readable storage 201, which may comprise, for example, an internal hard disk drive (HDD) (e.g., enhanced integrated drive electronics (EIDE) or serial advanced technology attachment (SATA)) for storage, flash memory, or the like. The member configuration data 22, the prioritized message lists 24, and the audio messages, for example, may be stored in the computer-readable storage 201. The drives and associated computer-readable and computer-usable media provide non-volatile storage of data, data structures, computer-executable instructions, and so forth. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of program modules can be stored in the computer-readable storage 201 and in the volatile memory 198, including an operating system 202 and one or more program modules 204, which may implement the functionality described herein in whole or in part, including, for example, functionality associated with communicating with the client device 12, maintaining and accessing member configuration data 22, or generating prioritized message lists 24, or other processing and functionality described herein. It is to be appreciated that the embodiments can be implemented with various commercially available operating systems 202 or combinations of operating systems 202.

All or a portion of the embodiments may be implemented as a computer program product, such as a computer-usable or computer-readable medium having a computer-readable program code embodied therein. The computer-readable program code can include software instructions for implementing the functionality of the embodiments described herein when executed on the central processing unit 190. The central processing unit 190, in conjunction with the program modules 204 in the volatile memory 198, may serve as a control system for the message server 16 that is configured to, or adapted to, implement the functionality described herein.

An administrator may be able to enter commands and information into the message server 16 through one or more input devices, such as, for example, a touch sensitive display (not illustrated); a keyboard (not illustrated); or a pointing device, such as a mouse (not illustrated). Other input devices (not illustrated) may include a microphone, an infrared (IR) remote control, a joystick, a game pad, a stylus pen, or the like. These and other input devices are often connected to the central processing unit 190 through an input device interface 206 that is coupled to the system bus 194, but can be connected by other interfaces such as a parallel port, an IEEE 1394 serial port, a game port, a universal serial bus (USB) port, an IR interface, etc.

The message server 16 may drive a separate or integral display 208, which may also be connected to the system bus 194 via an interface, such as a video port 210. The message server 16 preferably includes a communication interface 212 for communicating with a wireless LAN or wireless personal area network technology, including, for example, Wi-Fi®, Bluetooth®, or ZigBee®. The message server 16 also preferably includes a WAN communication interface 214 for communicating with one or more desired WAN technologies, such as, for example, 3G or 4G data telecommunications technologies, via which the message server 16 may communicate with the client device 12.

Those skilled in the art will recognize improvements and modifications to the preferred embodiments of the present disclosure. All such improvements and modifications are considered within the scope of the concepts disclosed herein and the claims that follow.

What is claimed is:

1. A method for displaying information about a message, comprising:

receiving, by a computing device, a subset of audio messages of a plurality of audio messages based on a prioritized list of the plurality of audio messages, wherein the subset comprises at least one audio message, the prioritized list of the plurality of audio messages being prioritized based on an aggregate message priority comprising a product of a first weight and a first sender designated priority corresponding to each of the plurality of audio messages, and a product of a second weight and a first recipient prioritization attribute corresponding to each of the plurality of audio messages; and displaying, on the computing device, for each audio message in the subset, a first sender priority indicium indicative of the first sender designated priority of each audio message, and a recipient priority indicium indicative of a priority corresponding to the first recipient prioritization attribute of each audio message.

2. The method of claim 1, wherein the first sender designated priority identifies a sender importance of each audio message.

3. The method of claim 1, wherein the first sender designated priority identifies a sender response urgency of each audio message.

4. The method of claim 1, wherein each audio message in the subset further comprises an associated second sender designated priority designated by a corresponding sender, and wherein displaying, for each audio message in the subset, the first sender priority indicium indicative of the first sender designated priority of each audio message, and the recipient priority indicium indicative of the priority corresponding to the first recipient prioritization attribute of each audio message further comprises:
 displaying, for each audio message in the subset, the first sender priority indicium indicative of the first sender designated priority of each audio message, a second sender priority indicium indicative of the second sender designated priority of each audio message, and the recipient priority indicium indicative of the priority corresponding to the first recipient prioritization attribute of each audio message.

5. The method of claim 4, wherein the first sender designated priority comprises a sender importance and the second sender designated priority comprises a sender response urgency.

6. The method of claim 1, wherein the first recipient prioritization attribute comprises a community attribute that identifies a particular message community of a plurality of message communities of which a corresponding sender is a member.

7. The method of claim 1, wherein displaying, for each audio message in the subset, the first sender priority indicium indicative of the first sender designated priority of each audio message, and the recipient priority indicium indicative of the priority corresponding to the first recipient prioritization attribute of each audio message further comprises:
 displaying, for each audio message in the subset, an aggregate message priority indicium indicative of the aggregate message priority of each audio message, the first sender priority indicium indicative of the first sender designated priority of each audio message, and the recipient priority indicium indicative of the priority corresponding to the first recipient prioritization attribute of each audio message.

8. The method of claim 1, further comprising displaying, for the at least one audio message in the subset, a message delegation indicium indicating that the at least one audio message has been delegated.

9. A computing device, comprising:
 a communication interface adapted to interface with a network; and
 a control system comprising a processor, the control system adapted to
  receive a subset of audio messages of a plurality of audio messages based on a prioritized list of the plurality of audio messages, wherein the subset comprises at least one audio message, the prioritized list of the plurality of audio messages being prioritized based on an aggregate message priority comprising a product of a first weight and a first sender designated priority corresponding to each of the plurality of audio messages, and a product of a second weight and a first recipient prioritization attribute corresponding to each of the plurality of audio messages; and
  display, for each audio message in the subset, a first sender priority indicium indicative of the first sender designated priority of each audio message, and a recipient priority indicium indicative of a priority corresponding to the first recipient prioritization attribute of each audio message.

10. The computing device of claim 9, wherein the first sender designated priority identifies a sender response urgency of each audio message.

11. The computing device of claim 9, wherein each audio message in the subset further comprises an associated second sender designated priority designated by a corresponding sender, and wherein to display, for each audio message in the subset, the first sender priority indicium indicative of the first sender designated priority of each audio message, and the recipient priority indicium indicative of the priority corresponding to the first recipient prioritization attribute of each audio message, the control system is further adapted to:
 display, for each audio message in the subset of the plurality of audio messages, the first sender priority indicium indicative of the first sender designated priority of each audio message, a second sender priority indicium indicative of the associated second sender designated priority of each audio message, and the recipient priority indicium indicative of the priority corresponding to the first recipient prioritization attribute of each audio message.

12. The computing device of claim 11, wherein the first sender designated priority comprises a sender importance and the second sender designated priority comprises a sender response urgency.

13. The computing device of claim 9, wherein the first recipient prioritization attribute comprises a community attribute that identifies a particular message community of a plurality of message communities of which a corresponding sender is a member.

14. The computing device of claim 9, wherein to display, for each audio message in the subset, the first sender priority indicium indicative of the first sender designated priority of each audio message, and the recipient priority indicium indicative of the priority corresponding to the first recipient prioritization attribute of each audio message, the control system is further adapted to:
 display, for each audio message in the subset, an aggregate message priority indicium indicative of the aggregate message priority of each audio message, the first sender priority indicium indicative of the first sender designated priority of each audio message, and the recipient priority indicium indicative of the priority corresponding to the first recipient prioritization attribute of each audio message.

15. A computer program product, comprising a non-transitory computer-usable medium having a computer-readable program code embodied therein, the computer-readable program code adapted to be executed on a processor to implement a method for delivering a message, the method comprising:
 receiving, by a computing device, a subset of audio messages of a plurality of audio messages based on a prioritized list of the plurality of audio messages, wherein the subset comprises at least one audio message, the prioritized list of the plurality of audio messages being prioritized based on an aggregate message priority comprising a product of a first weight and a first sender designated priority corresponding to each of the plurality of audio messages, and a product of a second weight and a first recipient prioritization attribute corresponding to each of the plurality of audio messages; and
 displaying, on the computing device, for each audio message in the subset, a first sender priority indicium indicative of the first sender designated priority of each audio message, and a recipient priority indicium indicative of a priority corresponding to the first recipient prioritization attribute of each audio message.

16. The computer program product of claim 15, wherein the first sender designated priority identifies a sender importance of each audio message.

17. The computer program product of claim 15, wherein the first sender designated priority identifies a sender response urgency of each audio message.

18. The computer program product of claim 15, wherein each audio message in the subset further comprises an associated second sender designated priority designated by a corresponding sender, and wherein displaying, for each audio message in the subset, the first sender priority indicium indicative of the first sender designated priority of each audio message, and the recipient priority indicium indicative of the priority corresponding to the first recipient prioritization attribute of each audio message, further comprises:

displaying, for each audio message in the subset, the first sender priority indicium indicative of the first sender designated priority of each audio message, a second sender priority indicium indicative of the second sender designated priority of each audio message, and the recipient priority indicium indicative of the priority corresponding to the first recipient prioritization attribute of each audio message.

19. The computer program product of claim 18, wherein the first sender designated priority comprises a sender importance and the second sender designated priority comprises a sender response urgency.

20. The computer program product of claim 15, wherein displaying, for each audio message in the subset, the first sender priority indicium indicative of the first sender designated priority of each audio message, and the recipient priority indicium indicative of the priority corresponding to the first recipient prioritization attribute of each audio message, further comprises:

displaying, for each audio message in the subset, an aggregate message priority indicium indicative of the aggregate message priority of each audio message, the first sender priority indicium indicative of the first sender designated priority of each audio message, and the recipient priority indicium indicative of the priority corresponding to the first recipient prioritization attribute of each audio message.

21. A method for displaying information about a message, comprising:

receiving, by a computing device, a subset of audio messages of a plurality of audio messages based on a prioritized list of the plurality of audio messages, wherein the subset comprises at least one audio message, the prioritized list of the plurality of audio messages being prioritized based on an aggregate message priority comprising a product of a first weight and a first sender designated priority corresponding to each of the plurality of audio messages, and a product of a second weight and a first recipient prioritization attribute corresponding to each of the plurality of audio messages; and displaying, on the computing device, for each audio message in the subset, an aggregate message priority indicium indicative of the aggregate message priority that is based on the first sender designated priority and the first recipient prioritization attribute corresponding to each audio message.

\* \* \* \* \*